United States Patent [19]
Alexander

[11] 4,221,600
[45] Sep. 9, 1980

[54] LIQUID DEFOAMING COMPOSITION

[75] Inventor: Donald E. Alexander, North Charleston, S.C.

[73] Assignee: Westvaco Corporation, New York, N.Y.

[21] Appl. No.: 874,639

[22] Filed: Feb. 2, 1978

[51] Int. Cl.$^2$ .................... B01D 19/02; C08L 97/02
[52] U.S. Cl. .................... 106/123 TQ; 106/285; 252/321
[58] Field of Search .................... 106/123 TQ, 285; 252/321

[56] References Cited

U.S. PATENT DOCUMENTS

| | | | |
|---|---|---|---|
| 2,868,734 | 1/1959 | De Castro et al. | 252/358 |
| 2,923,687 | 2/1960 | Jursich | 252/321 |
| 3,198,744 | 8/1965 | Lamont | 252/321 |
| 3,697,438 | 10/1972 | Lieberman | 252/321 |
| 3,751,373 | 8/1973 | Lieberman | 252/321 |
| 4,009,119 | 2/1977 | Poschman | 252/321 |

FOREIGN PATENT DOCUMENTS

568202 12/1958 Canada.

*Primary Examiner*—Theodore Morris

[57] ABSTRACT

Disclosed herein is a new liquid foaming control composition comprising from about 60% to about 90% by weight of a iquid aliphatic hydrocarbon having a boiling point of at least 150° F., such as mineral oil, from about 7% to about 36% by weight of an ester of a polyethylene glycol and a tall oil fatty acid, from about 1% to about 8% by weight of an aliphatic alcohol having from 20 to 32 carbon atoms, from about 0.5% to about 5% by weight of a high molecular weight hydrocarbon, and optionally from about 1% to about 6% by weight of an aliphatic alcohol, such as isopropanol. The defoaming composition is characterized as a stable solution having notable antifatigue properties in addition to its defoaming properties.

18 Claims, No Drawings

LIQUID DEFOAMING COMPOSITION

BACKGROUND OF THE INVENTION

1. Field of the Invention

This invention relates to defoaming compositions. More particularly, it relates to liquid compositions for the control of foam in aqueous systems.

2. Description of Prior Art

Foaming occurs in and frequently presents problems in numerous industrial processes in which aqueous solutions or suspensions are utilized. Due to the nature of the aqueous solutions or suspensions being processed, foaming may occur to such an extent as to interfere with the process being carried out. When foaming occurs to such an extent that process operations are impaired or product quality is degraded, chemical defoaming compositions are utilized to eliminate or retard interference by the foam of efficient operations.

In the paper industry foaming problems are experienced with black liquor, which is the spent cooking liquor derived from cooking wood pulp in accordance with the sulfate or kraft processes. Foaming also occurs in processing various pulp slurries in papermaking machines, waste disposal systems and the like.

A variety of chemical compositions have been used as defoamers and/or antifoamers. Depending on the nature of the system, any particular composition can be effective as either a defoamer, i.e., reduce or kill an existing foam, or as an antifoaming agent, i.e., will prevent foam from becoming established. Desirably the composition should perform both functions, however, this objective is not always attainable. Additionally, the stability and dispersibility of the composition to be used with foaming systems are important characteristics to be considered for a given application.

The compositions of this invention find applicability in various types of aqueous systems in which foams create problems, such as various papermaking processes, effluent disposal systems, sewage disposal systems, detergent-containing systems and other industrial systems in which the formation of foam creates a problem.

It is, therefore, the general object of this invention to provide versatile compositions for controlling, eliminating, or preventing foam in aqueous systems and which are stable, readily dispersible and have good antifatigue characteristics. The term "antifatigue" signifies a composition which has good staying power or effectiveness when used over a prolonged period of time.

Other objects, features and advantages of this invention will be evident from the following detailed description of the invention.

SUMMARY OF THE INVENTION

This invention is to a liquid foam control composition comprising from about 60% to about 90% by weight of liquid aliphatic hydrocarbon having a boiling point of at least 150° F.; from about 7% to 36% by weight of an ester of polyethylene glycol and a fatty acid, preferably, tall oil; from about 1% to about 8% by weight of an aliphatic alcohol having from 20 to 32 carbon atoms; from about 0.5% to about 5% by weight of a high molecular weight hydrocarbon; and optionally from about 1 to 6% by weight of an aliphatic alcohol having up to about 4 carbon atoms, preferably a $C_3$ alcohol. The foam control composition of the present invention is characterized by its stability and antifatigue properties in addition to its ability to act as a defoaming and foam preventing agent even when employed in rather small amounts.

DETAILED DESCRIPTION OF THE INVENTION

The aliphatic hydrocarbon is the carrier or base for the remaining constituents and is present in a major amount.

The aliphatic hydrocarbons suitable for use in the practice of this invention are liquid at room temperature and atmospheric pressure and have a minimum boiling point of at least about 150° F. Thus, aliphatic hydrocarbons such as hexane, heptane, octane, paraffin oil, mineral seal oil, white mineral oil, kerosene, have been found to be fully suited for use. If desired, mixtures of any two or more of these are other similar hydrocarbons can be employed. In the practice of this invention, the liquid aliphatic hydrocarbon component of the foam control composition generally comprises from about 60% to about 90% by weight of the total composition, preferably about 65% to about 80% and most preferably, about 70% to 75%. Mineral oil is the preferred aliphatic hydrocarbon; however since such liquids tend to be hydrophobic, emulsifiers or spreading agents are also employed.

One type of emulsifier found suitable with the aliphatic hydrocarbons are diesters of a polyethylene glycol and tall oil fatty acid.

The polyethylene glycol esters function as emulsifying agents in the present composition. Preferably, diesters of higher molecular weight carboxylic acid, e.g. $C_{12}$-$C_{22}$ fatty acids. The fatty acids employed in the preparation of the diesters are straight chain or branched chain aliphatic carboxylic acids which are saturated and/or unsaturated. Typically, lauric, stearic, caproic, caprylic, oleic, linoleic or mixtures thereof acids can be used. Tall oil is preferred material for the fatty acid store.

The polyethylene glycol employed has a molecular weight of at least 200, preferably between about 400 and 800. The ester of the relatively high molecular weight polyethylene glycol ordinarily comprises from about 7% to about 36% by weight of the final composition.

The most preferred diester is polyethylene glycol (600) ditallate which has been found to have the proper hydrophile-lipophile balance, (i.e., "HLB" about 10 ) when used with the remaining constituents. Thus, it has been found that the shorter the fatty acid chain length used, the lower the molecular weight of polyethylene glycol is used to maintain the proper HLB balance.

The fatty acid diesters of polyethylene glycol are prepared by esterifying polyethylene glycol with tall oil fatty acid. It is preferable to use a distilled tall oil fatty acid. Tall oil fatty acids typically contain less than 10% rosin acids and when redistilled usually contain less than 5% rosin acids. The tall oil fatty acids are predominantly a mixture of oleic and linoleic acids with lesser amounts of saturated and other unsaturated fatty acids. The small remainder consists of rosin acids and neutral materials.

Alternatively, the diesters may be made by ethoxylation of the fatty acids followed by capping with additional fatty acids.

Irrespective of the technique employed for making the diester emulsifier, it is important to have substantially complete esterification with a minimum amount of carboxylic acid present, i.e., less than 2 Acid Number. Fatty acids will convert to a salt under alkaline conditions to cause a drop in the effectiveness of the defoamer.

The fatty acid diester is generally employed in the present composition in an amount ranging up to about 36% by weight and preferably between about 10% and 25%.

The aliphatic alcohol employed in the foam control composition is a blend of linear and branched chain alcohols with carbon numbers ranging broadly from $C_{18}$ through $C_{32}$ with the major portion ranging from $C_{20}$ through $C_{28}$. Generally, from about 1% to about 8% by weight is employed, with from about 2% to 6% being preferred. The aliphatic alcohols may be added separately to the composition. However, as a practical matter it is commercially available from a variety of sources as a mixture of alcohols and high molecular weight hydrocarbons with carbon numbers ranging from $C_{24}$ to $C_{40}$. The weight ratio of alcohols to high molecular weight hydrocarbons can vary but is preferably about 2:1. One source of available alcohols and high molecular weight hydrocarbons is Ethyl Corporation, Baton Rouge, La., trademarked product EPAL 20+. The product is an off-white, soft, waxy solid congealing between 110° F. and 122° F. Conoco or Continental Oil Co.'s trademark product "ALFOL C-20" is also suitable as a source of high molecular weight alcohols.

The C-20+ aliphatic alcohols are an important part of the present composition. Alone, such a mixture has not been found to be particularly effective. Even when combined with a carrier such as mineral oil, the combination has proven to be unstable. However, when combined with diesters and aliphatic hydrocarbons an efficacious and highly desirable composition is obtained.

Isopropyl alcohol is optionally added to the compositon to provide additional stability. Preferably, about 1% to about 6% is added, although this amount can vary depending on the application. If desired, conventional wetting agents can be added in small amounts.

A distinct advantage of this invention is the ease with which the novel compositions can be prepared. The sequence in which the various components are admixed does not to any extent affect the physical or chemical characteristics of the final product. Thus, if desired, the esters could be initially added to the liquid hydrocarbon with the remaining components subsequently blended therewith. In the alternative, the C-20+ alcohols and high molecular weight hydrocarbons, if desired, could be initially admixed with either the esters, subsequently admixed with the isopropyl alochol and the entire mixture blended with the liquid hydrocarbon. Regardless of the sequence of steps employed in blending the ingredients, the actual blending of the components is facilitated if carried out at an elevated temperature, for example, at a temperature of from about 50° C. to about 100° C. In most instances the heating of the materials to a temperature of about 75° C. will effectively produce the desired blend.

In preparing the compositions of the invention, the mixture of components should be stirred or otherwise agitated to insure homogeneity in the final product. The heat and agitation should be applied continuously until the solution which ensues is relatively clear. Thereafter, the liquid blend is allowed to cool. The resulting composition is a pale amber solution.

After standing at room temperatures for extended periods of time, no perceptible change, either in the physical characteristics or the chemical properties of the compositions, will be observed.

Due to the diverse nature of the processes in which the present products function as anti-foaming and defoaming agents, it is virtually impossible to set forth proportions which will, in general, adequately embrace the specific quantities of the present products required to efficaciously produce the result desired in each and every process. The quantity needed will, for the most part, depend upon various factors in the particular process in which the product is to be used. Hence, for any one process, the most efficient and effective amount can be readily determined by anyone skilled in the particular art in which it is to be used.

The advantages which accrue from the present products, and from the use thereof as defoaming agents are many and varied. The products are not only superior and efficient antifoaming agents and defoaming agents but they also provide increased economy advantageous both to the manufacturer and to the consumer. Moreover, the properties of the present products are such that certain technical improvements in the processes which employ defoaming agents are now possible. Thus, in the first place, the present products are all liquid in form and are more easily handled than a vast majority of prior art products which are pasty in consistency. Moreover, whereas the majority of the ordinary paste defoamers contained large percentages of water, the composition of the present invention is a water free liquid which can be directed to the foaming solution to provide completely satisfactory antifoaming and defoaming action. This property itself will immediately suggest processes to those skilled in the art wherein the present products will find ready application. However, the present products are also highly satisfactory for use in those processes in which it is desirable to add the antifoaming agent or defoaming agent in the form of an aqueous emulsion, since they are readily emulsified with a minimum amount of agitation. Moreover, particularly advantageous is the fact that the emulsions thus produced are relatively quite stable. Thus, with the products of the present invention, the emulsification of the defoaming agent immediately prior to the use thereof is desired.

As will readily appear from a consideration of the examples presented hereinafter, the products of the present invention are superior liquid antifoaming and/or defoaming agents. This is true, notwithstanding the fact that the component ingredient of these products are not, in and of themselves, new or novel in the art. However, the superiority of the present compositions cannot be attributed merely to the individual effect exerted by each of the components of the product. Rather, the excellent results obtained with these products can only be attributed to an effect obtained by blending the particular components in the proportions indicated.

The following examples will illustrate the practice of this invention. These examples are exemplary and are not meant to be limiting.

EXAMPLE 1

This example illustrates one technique for preparing the foam control composition of the present invention.

To 73.3 parts mineral oil (note a) are added 18.3 parts of ditallate ester of polyethylene glycol (note b), 4.6 parts of a mixture of $C_{20}$–$C_{32}$ alcohols mixed with a high molecular weight hydrocarbon (2:1 weight ratio of alcohol to hydrocarbon) (note c). The aforementioned mixture was heated to 120° F. for sufficient time to melt the waxy alcohol-hydrocarbon. The fluid was cooled to room temperature and 3.8 parts isopropyl alcohol were added.

The resulting composition was a pale yellow clear fluid which remained stable overnight at room temperature.

Notes
(a) Mentor 28 (Exxon product)
(b) Carbowax 600—(Union Carbide product) mol. weight 600
(c) Epal 20+ (Ethyl Corp. product).

EXAMPLE 2

Laboratory tests were carried out using the composition prepared in Example 1. The composition was introduced in varied amounts into a recirculating synthetic black liquor solution (note d) having a solids content on the order of 0.06% to determine the effectiveness of the formulation.

Black liquor solution was continuously pumped into the middle of a 250 cc tube by a shear-type pump. The upper end of the tube was open and the bottom connected to the pump inlet. 0.5 SCFH air was introduced into the solution at the pump inlet. As the solution became foamy the foam height began to extend upwards into the free space (upper 125 cc part of the tube) and thereafter flowed out of the tube. The foam height was measured at 15 second intervals. The results were as follows:

1. A control run was carried out without any defoamer present. After 60 seconds the foam level reached the top of the tube (250 cc) and began to spill over thereafter.

2. 5, 10 & 15 ppm of the present composition were added to the recirculating foamy fluid with the following results:

5 ppm conc: at 60 sec. the foam height reached 210 cc. At 90 sec. the foam height reached 250 cc.

10 ppm conc: At 60 sec. the foam height reached 185 cc. At 160 sec. the foam height reached 250 cc.

15 ppm conc: At 60 sec. the foam height reached 185 cc. However, the foam height reached a peak of 245 cc at 270 sec. and remained constant.

Note d–Black liquor soln. contains 1.5g tall oil, 20.5g lignin (Indulin AT), 7.3 g NaOH, 15.6 g glucose salt, 3.7 g $Na_2S$, 2.3 g acetic acid, 1.5 g formic acid and 950 g distilled water. This synthetic black liquor concentrate of approximately 3% black liquor solids is used as a stock solution. This concentrate is further diluted with water and pH adjusted to the approximate conditions of the white water system for which the defoamer is being tested.

EXAMPLE 3

Similar tests were conducted using the Example 1 formulation except that the amount of the alcohol-hydrocarbon (note e) was increased to 7.0%.

The results were substantially identical to that shown in Example 2.

Note e: ALFOL C-20 also used instead of EPAL 20+

EXAMPLE 4

This example illustrates the dramatic effectiveness of the present invention when against a conventional defoamer employed for the same application.

A 50—50 mixture of Luke filtered screen room water and synthetic black liquor solution was prepared and recirculated through a graduated cylinder test apparatus as in Example 3. Defoamer addition was made just prior to agitation of the test liquor and the foam levels recorded at different time intervals. Various concentrations of defoamers were added. The test compared the composition of the present invention (Example 1 formulation) against a commercially available Betz 300-9 which comprises a fatty acid formulation without any $C_{20}+$ alcohols.

A nine fold difference was observed between the effective concentrations of the two compositions tested, i.e., 0.04 mg/l for the present composition against 0.36 mg/l for the Betz composition. Thus, the present composition yields a higher effectiveness than previously used defoamers.

While the invention has been described and illustrated herein by reference to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A liquid foam control composition comprising:
   (a) from about 60% to about 90% by weight of a liquid aliphatic hydrocarbon having a boiling point of at least 150° F.;
   (b) from about 7% to about 36% by weight of an emulsifier comprising an ester of a polyethylene glycol having a molecular weight greater than about 200 and a fatty acid;
   (c) from about 1% to 8% by weight of an aliphatic alcohol having from 20 to 32 carbon atoms;
   (d) from about 0.5% to about 5% by weight of a high molecular weight hydrocarbon; and
   (e) up to about 6% by weight of an alcohol solvent having from 1 to 4 carbon atoms;
   said composition being characterized as excluding a sulfonic acid component.

2. The composition according to claim 1 wherein the aliphatic hydrocarbon is taken from the group consisting of hexane, heptane, octane, paraffin oil, mineral seal oil, white mineral oil, kerosine naptha, and mixtures thereof.

3. The composition according to claim 1 wherein the aliphatic hydrocarbon is mineral oil.

4. The composition according to claim 3 wherein the mineral oil is paraffin oil.

5. The composition according to claim 3 wherein the mineral oil is white mineral oil.

6. The composition according to claim 3 wherein the mineral oil is mineral seal oil.

7. The composition according to claim 1 wherein the emulsifier is a diester of a polyethylene glycol having a molecular weight from about 400 to about 800.

8. The composition according to claim 7 wherein the fatty acid is taken from the group consisting of saturated or unsaturated fatty acids having from about 12 to about 22 carbon atoms.

9. The composition according to claim 7 wherein the fatty acid is tall oil.

10. The composition according to claim 9 wherein the aliphatic alcohol is present in an amount ranging from about 2% to about 6% by weight and includes a major portion of $C_{20}$ to $C_{28}$ components.

11. The composition according to claim 10 wherein the high molecular weight hydrocarbon is a mixture of $C_{24}$ to $C_{40}$ compounds and is present in an amount ranging from about 1% to about 3% by weight.

12. The composition according to claim 1 wherein the alcohol solvent is isopropyl alcohol which is present in an amount ranging from about 2% to about 4% by weight.

13. The composition according to claim 12 wherein the aliphatic hydrocarbon is a mineral oil.

14. The composition according to claim 13 wherein the alcohol solvent is isopropyl alcohol which is present in an amount which is effective in preventing precipitation or separation of the higher molecular weight aliphatic alcohol from the composition.

15. A liquid foam control composition characterized as a non-aqueous solution comprising:
    (a) from about 60% to about 90% by weight of a mineral oil carrier having a boiling point of at least 150° F.;
    (b) from about 10% to about 25% by weight of a polyethylene glycol di-tallate surface active agent;
    (c) from about 1% to about 10% by weight of a mixture of (1) a major amount of aliphatic alcohols having from about 20 to about 32 carbon atoms and (2) a minor amount of a high molecular weight hydrocarbon, said mixture being a waxy, solid prior to incorporation within the carrier mineral oil; and
    (d) an effective amount of isopropyl alcohol solvent.

16. The composition according to claim 15 further characterized as a pale yellow liquid which has stability on standing and good antifatigue properties in use.

17. The composition according to claim 16 wherein the polyethylene glycol portion of the diester has a molecular weight of 600.

18. A foam control liquid composition consisting essentially of:
    (a) from about 60% to about 90% by weight of a liquid carrier taken from the group consisting of hexane, heptane, octane, paraffin oil, mineral seal oil, white mineral oil, kerosine, or mixtures thereof;
    (b) from about 7% to about 36% by weight of a surface active agent comprising a polyethylene glycol-fatty acid diester, said fatty acid component taken from the group consisting essentially of oleic and linoleic acids or mixtures thereof;
    (c) from about 1% to about 10% by weight of a mixture of aliphatic alcohols with carbon numbers ranging from about 20 to 32 and high molecular weight hydrocarbons with carbon numbers ranging from 24 to 40; and
    (d) from about 1% to about 6% by weight of an alcohol stabilizer;
    said composition being further characterized as having excellent defoaming, antifoaming and antifatigue properties.

* * * * *